United States Patent
Lebaredian et al.

(10) Patent No.: US 8,195,731 B1
(45) Date of Patent: Jun. 5, 2012

(54) SYSTEM, METHOD, AND COMPUTER PROGRAM PRODUCT FOR DETERMINING AT LEAST ONE ROOT OF AN N-DIMENSIONAL FUNCTION UTILIZING TRIANGULATION

(75) Inventors: Rev Lebaredian, Austin, TX (US); Vasiliy Skvortsov, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 1210 days.

(21) Appl. No.: 12/001,503

(22) Filed: Dec. 11, 2007

(51) Int. Cl.
*G06F 7/38* (2006.01)
(52) U.S. Cl. ....................................................... 708/446
(58) Field of Classification Search .................... 708/446
See application file for complete search history.

(56) References Cited

U.S. PATENT DOCUMENTS

| | | | |
|---|---|---|---|
| 7,412,089 B2* | 8/2008 | Squires et al. | 382/141 |
| 2004/0248589 A1* | 12/2004 | Gwon et al. | 455/456.1 |
| 2005/0021582 A1* | 1/2005 | Kallay | 708/446 |
| 2006/0022997 A1* | 2/2006 | Spampinato et al. | 345/606 |
| 2007/0159924 A1* | 7/2007 | Vook et al. | 367/127 |

OTHER PUBLICATIONS

Lebaredian, R. et al., U.S. Appl. No. 12/001,669, filed Dec. 11, 2007.
Lebaredian, R. et al., U.S. Appl. No. 12/001,504, filed Dec. 11, 2007.

\* cited by examiner

*Primary Examiner* — Chuong D Ngo
(74) *Attorney, Agent, or Firm* — Zilka-Kotab, PC

(57) ABSTRACT

A system, method, and computer program product are provided for determining at least one root of an n-dimensional function, utilizing triangulation. In operation, an n-dimensional function is received. Additionally, at least one root of the n-dimensional function is determined utilizing triangulation.

3 Claims, 4 Drawing Sheets

SYSTEM, METHOD, AND COMPUTER PROGRAM PRODUCT FOR DETERMINING AT LEAST ONE ROOT OF AN N-DIMENSIONAL FUNCTION UTILIZING TRIANGULATION

FIELD OF THE INVENTION

The present invention relates to mathematical functions, and more particularly to finding roots for such functions.

BACKGROUND

Root-finding is a technique for finding a value x such that $f(x)=0$, for a given function $f$. Such value x is called a root of the function $f$. Given a scalar valued, n-dimensional function of the form $f(x_1, x_2, \ldots, x_n)$, or more succinctly $f(\vec{p})$, root finding involves finding a number of points (values of $\vec{p}$) where $f(\vec{p})=0$.

Many applications employ root-finding techniques. For such applications, a highly efficient and/or effective root-finding technique is desired. Thus, there is a continuing need to find roots in a more effective and/or efficient manner.

SUMMARY

A system, method, and computer program product are provided for determining at least one root of an n-dimensional function, utilizing triangulation. In operation, an n-dimensional function is received. Additionally, at least one root of the n-dimensional function is determined utilizing triangulation.

DETAILED DESCRIPTION

Figure 1:
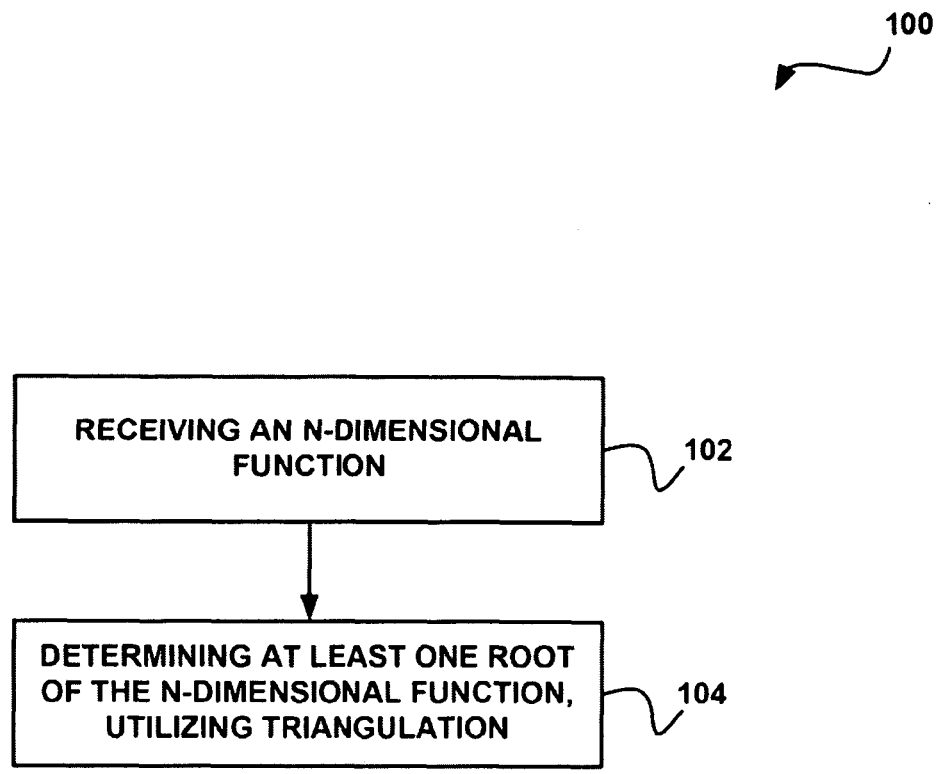
FIG. 1 shows a method for determining at least one root of an n-dimensional function utilizing triangulation, in accordance with one embodiment.

FIG. 1 shows a method 100 for determining at least one root of an n-dimensional function utilizing triangulation, in accordance with one embodiment. As shown, an n-dimensional function is received. See operation 102.

In the context of the present description, an n-dimensional function refers to any function with one or more dimensions, where n is any integer. For example, in various embodiments, n may be one or more, two or more, ten or more, and/or any other integer.

Additionally, at least one root of the n-dimensional function is determined utilizing triangulation. See operation 104. In the context of the present description, triangulation refers to any technique of constructing a simplex or a plurality of simplexes utilizing a set of points. Furthermore, simplexes refer to any n-dimensional analogue of a triangle. In various embodiments, such simplexes may include a triangle, a tetrahedron, a pentachoron, a hexateron, etc.

In one embodiment, the root may be determined utilizing a simplex mesh. In the context of the present description, a simplex mesh refers to any collection of simplexes. In this case, the root of the n-dimensional function may be determined by testing the simplex mesh.

Strictly as an option, the triangulation may include Delaunay triangulation. In the context of the present description, Delaunay triangulation refers to a technique of finding a triangle for a given set of points such that the triangle is the closest possible fit to an equilateral triangle for those points. It should be noted that Delaunay triangulation is only one specific example of triangulation and various other triangulation techniques may be utilized.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
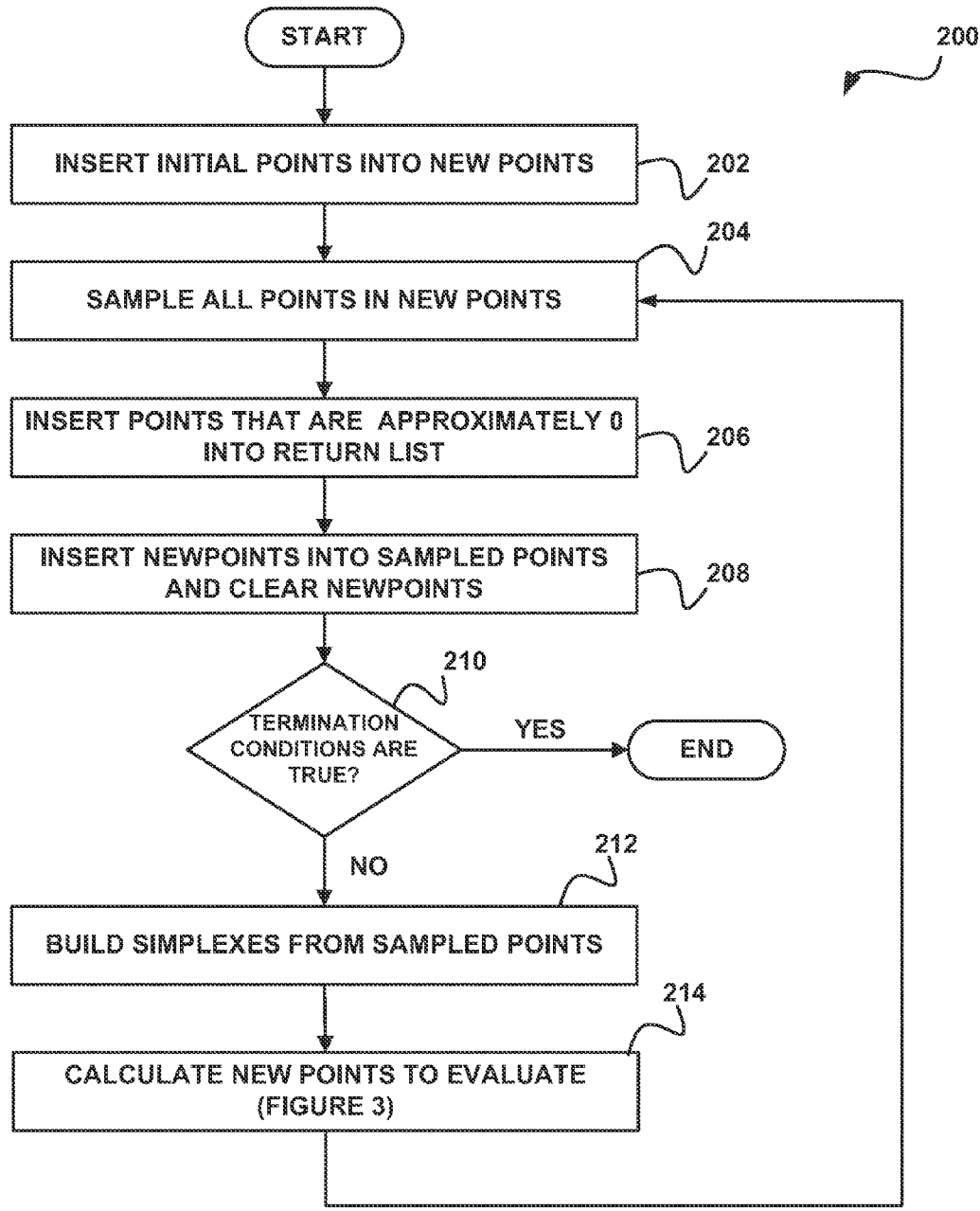
FIG. 2 shows a method for determining at least one root of an n-dimensional function utilizing triangulation, in accordance with another embodiment.

FIG. 2 shows a method 200 for determining at least one root of an n-dimensional function utilizing triangulation, in accordance with another embodiment. As an option, the present method 200 may be implemented in the context of the details of FIG. 1. Of course, however, the method 200 may be carried out in any desired environment. It should also be noted that the aforementioned definitions may apply during the present description.

As shown, a plurality of initial points are identified and all of the initial points are inserted into a first list (e.g. a new points list). See operation 202. For example, a set of points $\vec{p}_0, \vec{p}_1, \ldots, \vec{p}_m$ may be identified. All points in the list of new points are then evaluated (i.e. sampled). See operation 204.

For example, a function $f(\vec{p})$ may be evaluated for each of the points in the new points list. Once evaluation of all points in the new points list is completed, the points are examined to determine if the points are approximately 0. Points that are approximately zero are inserted into a second list (e.g. a return list). See operation 206.

Expression 1 shows one example of determining whether the function $f(\vec{p})$ is approximately zero for certain points.

$$|f(\vec{p}_i)| < \epsilon \qquad \text{Expression 1}$$

In this case, it may be determined whether $f(\vec{p})$ is less than $\epsilon$, where $\epsilon$ is a tolerance value. Thus, it may be determined whether all points that are evaluated are within the tolerance $\epsilon$. In this case, $\epsilon$ may be a predetermined tolerance value.

Once the points that are approximately 0 are inserted into the return list, points in the new points list are then inserted into a third list (e.g. a sampled points list) and the new points list is cleared. See operation 208. Once the new points list is cleared, it is determined whether termination conditions have been met. See operation 210.

For example, various criteria may be examined to determine whether a sufficient number of roots have been found or whether the search for additional points (e.g. roots) should be continued. In other words, additional points may be conditionally identified based on predetermined criteria.

In various embodiments, the criteria may include, but are not limited to, a minimum number of iterations, a maximum number of iterations, a minimum number of roots, and a maximum amount of time has elapsed in the search, etc. For example, a number may be established indicating a minimum number of points or lists of points to be tested. Similarly, a number may be established indicating a maximum number of points or lists of points to be tested.

Still yet, a threshold time may be established for determining the roots. For example, it may be determined that when a time that a root search is occurring (t) reaches a predetermined time threshold (T), the search should be terminated. Additionally, it may be determined that a search for roots should be terminated if a certain amount of roots have been found.

If the termination criteria have not been met, simplexes may be built from the sampled points list. See operation 212. For example, depending on the dimension of a function being searched, such simplexes may include a triangle, a tetrahedron, a pentachoron, a hexateron, etc. Once simplexes are constructed, additional points may be calculated for evaluation. See operation 214.

In one embodiment, the additional points may be calculated utilizing a simplex mesh. For example, a simplex mesh (e.g. a triangular mesh, etc.) in n dimensions may be created from the sampled points list using a triangulation technique (e.g. Delaunay triangulation, etc.). In this case, each triangle (e.g. when n=2), or simplex in n dimensions, may be tested for sign uniformity.

Figure 3:
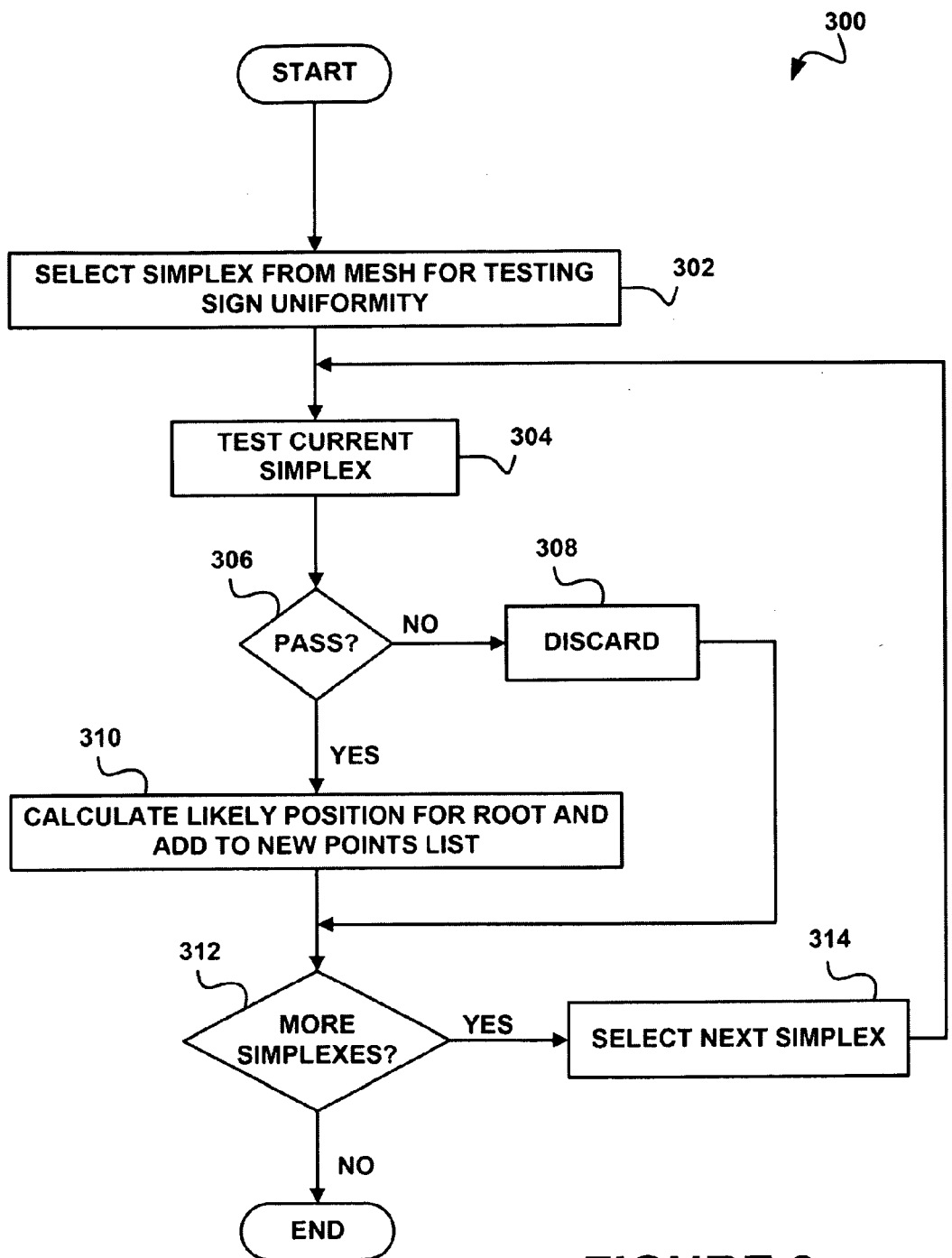
FIG. 3 shows a method for testing a simplex mesh for sign uniformity, in accordance with one embodiment.

FIG. 3 shows a method 300 for testing a simplex mesh for sign uniformity, in accordance with one embodiment. As an option, the present method 300 may be implemented in the context of the details of FIGS. 1-2. Of course, however, the method 300 may be carried out in any desired environment. Again, the aforementioned definitions may apply during the present description.

As shown, a simplex is selected from a mesh for testing sign uniformity. See operation 302. Once selected, the simplex is tested. See operation 304. As a result of testing, it is determined whether the simplex passes or fails the test. See operation 306.

For example, if signs of a resulting scalar value of the evaluation of a function $f$ at all the vertices of the simplex are positive, or if the signs are all negative, the simplex is discarded. See operation 308. If however, the signs are mixed, a root is potentially present within the simplex.

In this case, the most likely position for the root within the simplex is calculated and inserted into a list of points (e.g. the new points list) to evaluate in a subsequent iteration. See operation 310. Determining the most likely position for the root within the simplex may be accomplished in a variety of ways. For example, in one embodiment, the underlying function $f$ may be assumed to be continuous.

In this case, the discrete sample points that have been sampled from the function to construct an approximation of the function $f$ may be used. As an option, a linear approximation using the simplex mesh constructed from the sample point may be utilized. Within every simplex, it may be assumed that the values are linearly varying. Given the assumption of linearity, it is desirable to find the most likely point within the simplex that will evaluate to 0.

In one embodiment, this may be accomplished by first finding all edges in the simplex with vertices whose signs do not match. For each one of these edges, it may be determined which point along the edge evaluates to 0 when linearly interpolating the values at the vertices. Once all of these points have been determined, the centroid of the all the points may be found. This gives a good estimation at the most likely candidate for a 0 within the simplex.

Once the most likely position for the root within the simplex is calculated, it is determined whether there are more simplexes to be tested. See operation 312. If it is determined that more simplexes are to be tested, the next simplex is selected and tested. See operation 314.

Once all the simplexes have been tested, the new set of points is evaluated and added to the set of initial points already evaluated (e.g. the sampled points list). At this point, iterations may be made through the criteria checking, mesh creation, and new point determination operations until the criteria checking determines the iteration should end.

Table 1 shows pseudo code for determining at least one root of an n-dimensional function utilizing triangulation, in accordance with one embodiment. As an option, the pseudo code in Table 1 may be implemented in the context of the details of FIGS. 1-3. Of course, however, the pseudo code in Table 1 may be carried out in any desired environment.

TABLE 1

```
PointList RootFind(PointList initial_points)
{
   PointList SampledPoints;
   PointList NewPoints;
   PointList Ret;
   Insert initial_points into NewPoints
   while(1)
      {
      SampleAllPoints(NewPoints)
      foreach point in NewPoints
         if point is approximately 0
            Insert point into Ret
      Insert NewPoints into SamplePoints
      Clear NewPoints
      if termination conditions are met
         break out of loop
      Simplexes = triangulate(SampledPoints);
         foreach Simplex in Simplexes
            if signs of Simplex vertices are mixed
            {
               Calculate new sample point in simplex
               Insert new sample point into NewPoints
            }
      }
   return Ret;
}
```

It should be noted that determining roots of n-dimensional functions utilizing triangulation, as discussed above, has a wide range of applications. In various embodiments, determining roots may be implemented in the context of any application involving computing, mathematics, algebraic geometry, and any other field where determining roots may be useful. For example, the roots of functions may be determined for the purposes of determining systems of equilibrium, elliptical orbits, solutions Van der Waals equation, natural frequencies of spring systems, and/or any many other applications.

In one embodiment, the root of a function may be determined for the purposes of determining at least one application setting. In the context of the present description, an application refers to any software that employs the capabilities of a system. For example, in various embodiments, the application may include, but is not limited to, a gaming application, a graphics application, a word processing application, a media playing application, and/or any other application that meets the above definition.

In this case, a system refers to any system capable of utilizing or running an application. For example, in various embodiments, the system may include, but is not limited to, a computer (e.g. a desktop, a laptop, a server, a personal computer, etc.), a personal digital assistant (PDA), a mobile phone, a gaming device, and/or any other system that meets the above definition.

Furthermore, an application setting refers to any modifiable and/or selectable parameter associated with an application. For example, in various embodiments, the application setting may include, but is not limited to, sound quality, anti-aliasing, resolution, glow, high dynamic range (HDR) quality, filtering, grass, texture resolution, water quality, and sound, etc. In one embodiment, the application setting may include a game setting.

Further information and details regarding the identification of roots for the purposes of determining application settings may be found with reference to a co-pending U.S. patent application Ser. No. 12/001,669, entitled "SYSTEM, METHOD, AND COMPUTER PROGRAM PRODUCT FOR DETERMINING APPLICATION PARAMETERS BASED ON HARDWARE SPECIFICATIONS," which was filed coincidentally herewith, and with additional reference to co-pending U.S. patent application Ser. No. 12/001,504, entitled "SYSTEM, METHOD, AND COMPUTER PROGRAM PRODUCT FOR DETERMINING A PLURALITY OF APPLICATION SETTINGS UTILIZING A MATHEMATICAL FUNCTION," which was also filed coincidentally herewith, naming common inventors, and which are incorporated herein by reference in their entirety.

Figure 4:
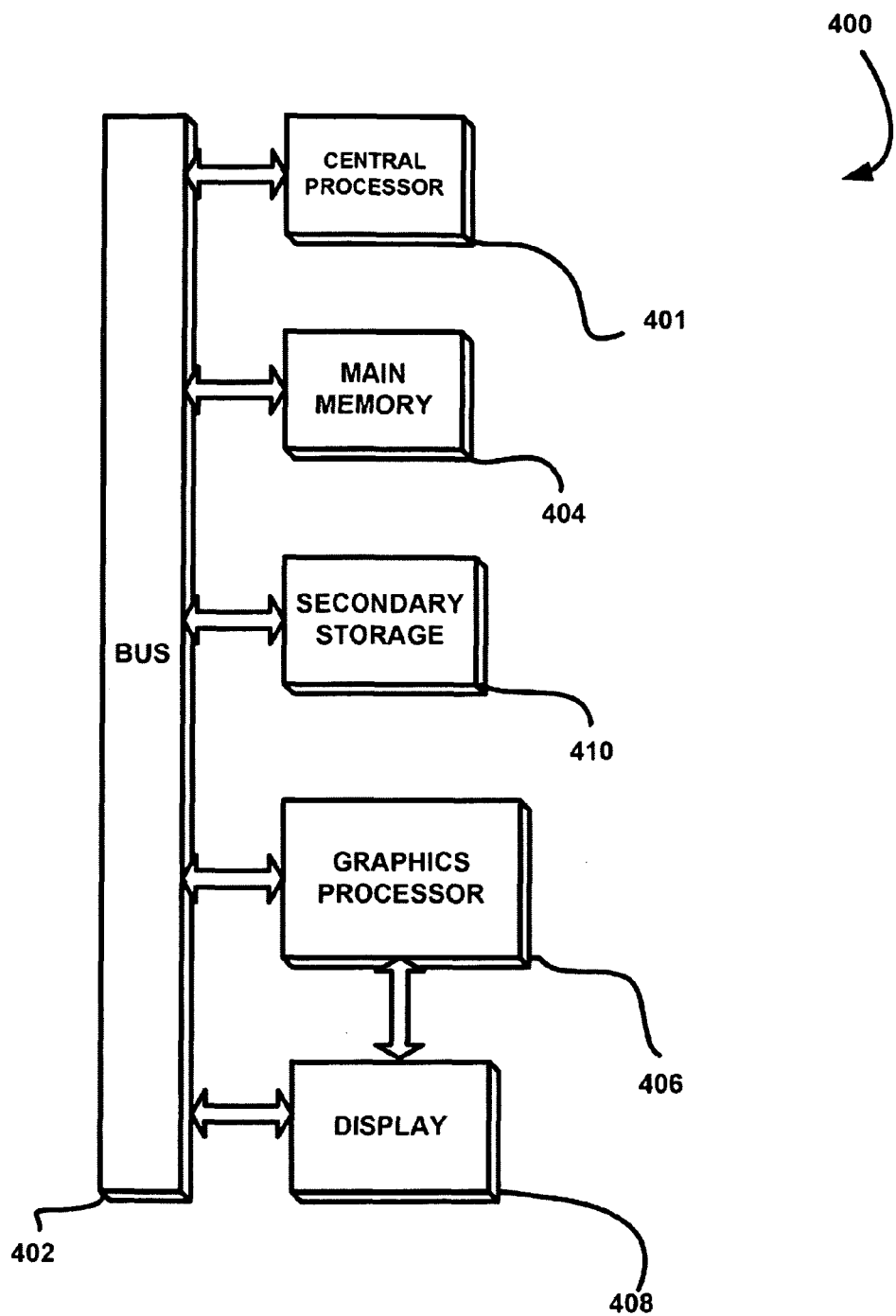
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, the computer program product including instructions which, when executed by a processor, cause the processor to perform a method comprising:

receiving an n-dimensional function;
identifying a plurality of initial points by sampling the received n-dimensional function;
inserting all of the initial points into a first list;
evaluating each of the initial points in the first list against a function;
inserting into a second list each of the initial points of the first list which evaluate against the function to less than a predetermined tolerance value;
in response to inserting into the second list each of the initial points of the first list which evaluated against the function to less than the predetermined tolerance value, inserting each of the initial points in the first list into a third list, and clearing the first list;
constructing at least one simplex utilizing each of the initial points in the third list;
selecting at least one simplex from the at least one simplex constructed utilizing each of the initial points in the third list;
calculating a position for a root within the selected at least one simplex;
inserting the calculated position for the root within the selected at least one simplex into the first list as a point;
evaluating the point in the first list, of the calculated position for the root within the selected simplex, against the function utilized to evaluate each of the initial points in the first list; and
inserting into the second list the point in the first list in response to the point in the first list being evaluated against the function to less than the predetermined tolerance value.

2. An apparatus, comprising:
a processor; and
a computer-readable memory, the computer-readable memory storing instructions that when executed by the processor implement a method comprising:

receiving an n-dimensional function, identifying a plurality of initial points by sampling the received dimensional function, inserting all of the initial points into a first list, evaluating each of the initial points in the first list against a function, inserting into a second list each of the initial points of the first list which evaluate against the function to less than a predetermined tolerance value, in response to inserting into the second list each of the initial points of the first list which evaluated against the function to less than the predetermined tolerance value, inserting each of the initial points in the first list into a third list, and clearing the first list, constructing at least one simplex utilizing each of the initial points in the third list, selecting at least one simplex from the at least one simplex constructed utilizing each of the initial points in the third list, calculating a position for a root within the selected at least one simplex, inserting the calculated position for the root within the selected at least one simplex into the first list as a point, evaluating the point in the first list, of the calculated position for the root within the selected simplex, against the function utilized to evaluate each of the initial points in the first list, and inserting into the second list the point in the first list in response to the point in the first list being evaluated against the function to less than the predetermined tolerance value.

3. The apparatus of claim 2, wherein the processor remains in communication with the computer-readable memory and a display via a bus.

* * * * *

UNITED STATES PATENT AND TRADEMARK OFFICE
CERTIFICATE OF CORRECTION

PATENT NO. : 8,195,731 B1
APPLICATION NO. : 12/001503
DATED : June 5, 2012
INVENTOR(S) : Lebaredian et al.

Page 1 of 1

It is certified that error appears in the above-identified patent and that said Letters Patent is hereby corrected as shown below:

In the claims:
Claim 2, col. 7, line 3; please replace "dimensional" with --n-dimensional--.

Signed and Sealed this
Nineteenth Day of March, 2013

Teresa Stanek Rea
*Acting Director of the United States Patent and Trademark Office*